United States Patent
Arrowood

[11] 3,933,377
[45] Jan. 20, 1976

[54] HANGER ASSEMBLY FOR PIPE

[75] Inventor: Gordon W. Arrowood, Palmetto, Ga.

[73] Assignee: McKenney's, Inc., Atlanta, Ga. ; a part interest

[22] Filed: May 30, 1974

[21] Appl. No.: 474,603

[52] U.S. Cl. .................... 285/61; 248/62; 285/236
[51] Int. Cl.² .......................................... F16L 3/00
[58] Field of Search ............ 285/61, 197, 198, 199, 285/236, 64, 62, 63; 248/62, 58

[56] References Cited
UNITED STATES PATENTS

| 883,673 | 3/1908 | Shepard | 248/62 |
|---|---|---|---|
| 1,758,040 | 5/1930 | Hess | 248/62 X |
| 1,986,861 | 1/1935 | Starr | 248/62 |
| 3,194,590 | 7/1965 | Cook | 285/61 |
| 3,233,922 | 2/1966 | Evans | 285/236 |
| 3,298,717 | 1/1967 | Rothwell et al. | 285/197 |
| 3,539,138 | 11/1970 | Desroches | 248/62 |
| 3,577,930 | 5/1971 | Rooklyn | 248/62 X |

FOREIGN PATENTS OR APPLICATIONS

| 518,462 | 11/1955 | Canada | 248/62 |
| 1,152,436 | 9/1957 | France | 285/61 |

*Primary Examiner*—Thomas F. Callaghan
*Attorney, Agent, or Firm*—Newton, Hopkins & Ormsby

[57] ABSTRACT

A hanger assembly for pipe joints which includes a pipe joint coupling and a removable stabilizer for connecting the coupling to the hanger bar. The stabilizer includes a saddle sandwiched between the shield and the clamping bands of the coupling. The shield, in turn, surrounds the resilient sleeve into which the ends of the pipes project. The saddle is formed from a pair of thin arcuate saddle plates, the outer edges of which are provided with outwardly projecting alignment tabs.

An outwardly projecting flat lug on the saddle is formed from a pair of flat rectangular opposed lug elements joined at their distal ends along a common edge and respectively joined to the saddle plates at their proximal ends. The lug has a hole for receiving a securing bolt which passes both through the lug and through an eyelet, at one end of the hanger rod. The other end of the hanger rod is anchored to the supporting structure. In one embodiment, the lug is disposed axially while, in the other embodiment, the lug is disposed radially. Each stabilizer depicted in the drawing is formed from a unitary piece of sheet metal. In a third embodiment, the axially disposed lug elements diverge from each other so as to pivot the saddle plates to conform to varying sizes of pipes.

12 Claims, 9 Drawing Figures

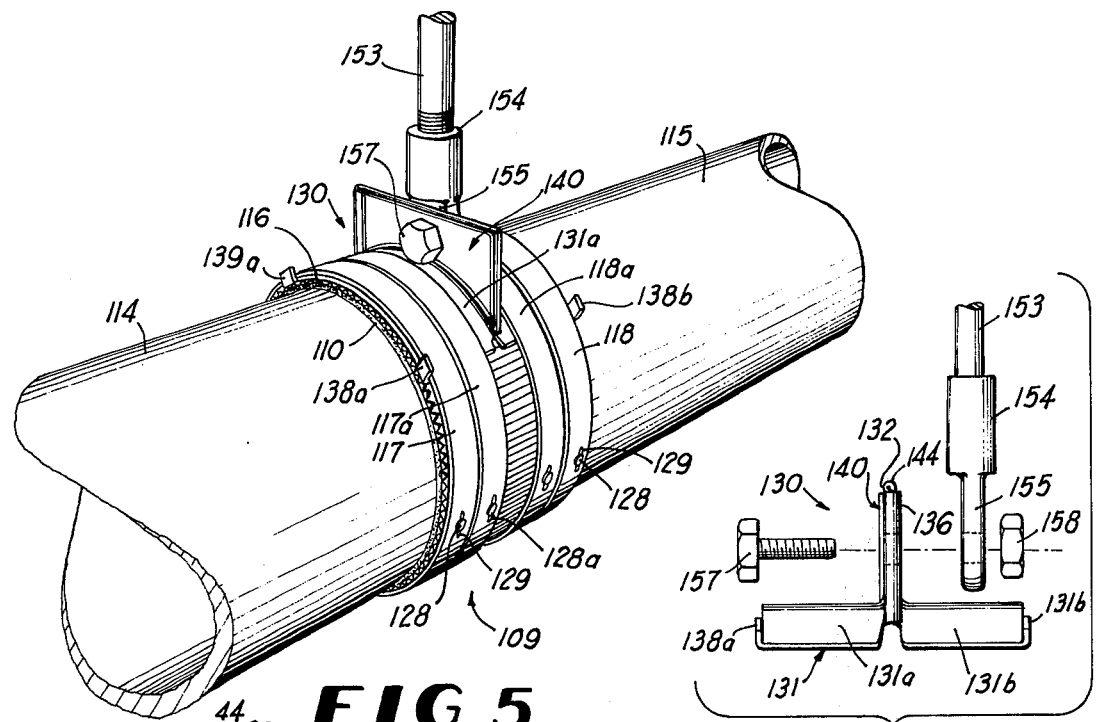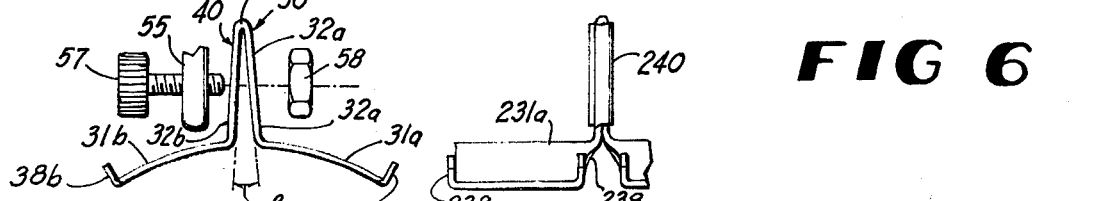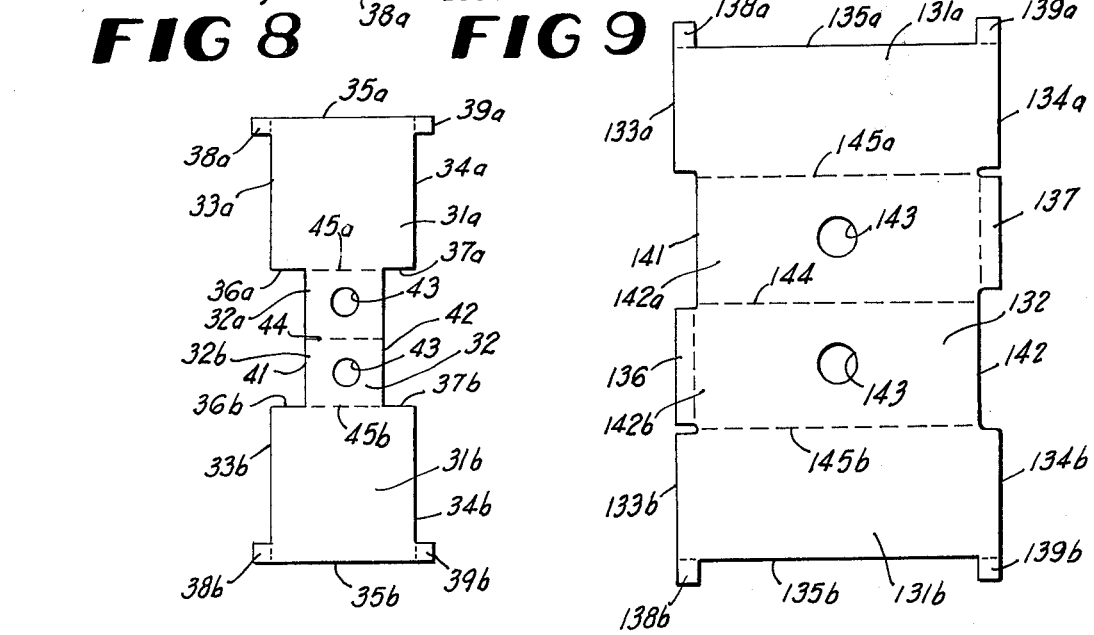

HANGER ASSEMBLY FOR PIPE

BACKGROUND OF THE INVENTION

1. Field of The Invention

This invention relates to a hanger assembly for pipe joints and is more particularly concerned with a combination pipe joint coupling and stabilizer, the combination serving to join the ends of the pipes together and also to support these ends, at the joint, in a prescribed position with respect to a supporting structure.

2. Description of the Prior Art

In the past, two generally accepted types of supports have been provided for cast iron pipes which are utilized extensively in plumbing. One of these prior art supports is the clevis hanger which is usually inserted over the end of the pipe, prior to the time that the pipe is coupled to the next adjacent pipe, the clevis hanger loosely encompassing the pipe and providing a threaded socket which receives the end of the hanger rod. The pipe so supported is usually free to slide axially in the clevis hanger and may pivot, but is supported at an appropriate elevation and is restrained from appreciable lateral movement. The clevis hanger may also be installed by removing its axle bolt, in which event it may be installed over the central part of the pipe. The reinstalling of the axle is difficult and a tight fit is never provided nor is the pipe held rigidly.

The second type of prior art support includes the split ring hanger which has essentially the same function as the clevis hanger except that a split ring hanger may be installed on a pipe after the pipe ends have been joined. In other words, the split ring hanger may be inserted onto the pipe without being placed over the end of the pipe. The split ring hanger receives the hanger rod for supporting the pipe. This prior device, like the preceding device, does not appreciably arrest the pipe from movement in an axial direction or from pivoting; however, it does support the pipe section and arrest appreciable lateral movement thereof.

In each of the prior art devices, the joint portion of a pipe is essentially free for limited movement so that, at times, the joint may be ruptured due to inadvertent movement of the pipes, this instability causing excessive stress at the pipe joint.

Still other prior art supports for pipes include brackets, one hole strips, wire staples, stakes and sway braces, all of which are well known in the art.

While substantially all plumbing codes require that pipes for plumbing be supported at the joints, this has been interpreted to mean as close to the joint as practical, since no hanger has, heretofore, been developed to my knowledge with a capability of supporting the pipes at the joints. Thus, in the past, when a NO-HUB pipe joint, as recommended by the Cast Iron Soil Pipe Institute, was used, the supports were disposed adjacent to the joint on one or both sides for supporting the pipes themselves. Pamphlet No. 100 entitled "INSTALLATION SUGGESTIONS FOR NO-HUB PIPE AND FITTINGS," printed first in October 1966 and subsequently in February 1967, May 1969 and June 1972, illustrate the many recommended ways in which the NO-HUB joint is to be supported. U.S. Pat. No. 3,233,922 discloses the NO-HUB pipe joint itself.

The present invention provides a means by which the NO-HUB pipe joint of U.S. Pat. No. 3,233,922 can be supported at the pipe joint.

Other disadvantages of the prior art hangers are that many of them are expensive, they are time consuming and expensive to install, they do not support the very ends of the pipes and they permit appreciable longitudinal movement of the pipe, as well as some lateral movement thereof.

BRIEF SUMMARY OF THE INVENTION

Briefly described, the present invention includes a removal stabilizer which is formed from a flat sheet metal blank into a lug, connected to a thin arcuate saddle which is sandwiched between the compression bands and the shield of the prior art coupling depicted in U.S. Pat. No. 3,233,922. The saddle conforms to the curvature or outer contour of the shield and is held in place by the compression bands around the outer periphery of the shield. Up turned tabs, on the edges of the saddle, act as guides for the bands. The flat rectangular lug projects outwardly between the bands from the central portion of the saddle, the lug provided with a hole, through which a lock bolt projects for securing the lug to the eyelet on the end of the hanger rod. The lug is disposed either radially or circumferentially, depending upon the needs of the plumber and the type of pipe coupling employed.

Accordingly, it is an object of the present invention to provide a hanger assembly for pipe which will couple the end portions of the pipes together and also provide support of these pipes at their coupled end portions.

Another object of the present invention is to provide a hanger assembly which is inexpensive to manufacture, durable in structure and efficient in operation.

Another object of the present invention is to provide a hanger assembly for pipes which will arrest the pipes from any appreciable axial movement while at the same time, providing a sufficiently flexible joint that, if movement of the pipe occurs, the hanger assembly will compensate therefor.

Another object of the present invention is to provide a hanger assembly which will materially reduce the cost of joining and supporting pipes.

Another object of the present invention is to provide a stabilizer for a pipe coupling, the stabilizer being quickly, easily and inexpensively installed on a conventional pipe coupling and readily and easily removed therefrom, without special tools.

Another object of the present invention is to provide a stabilizer for a pipe coupling, the stabilizer being inexpensive, light in weight and occupying very little space.

Another object of the present invention is to provide a stabilizer for a pipe coupling, the stabilizer being readily and easily mass produced.

Another object of the present invention is to provide a stabilizer for a pipe coupling providing firm and positive support at the joints for the coupling and the pipes connected thereto.

Another object of the invention is to provide a hanger assembly for pipes which will reduce to a minimum the space required to provide a suitable supported pipe joint.

Other objects, features and advantages of the present invention will become apparent from the following description when taken in conjunction with the accompanying drawings.

DESCRIPTION OF THE DRAWINGS

FIG. 4 is a plan view of the flat blank from which the stabilizer of FIGS. 1 through 3 is formed;

FIG. 5 is a fragmentary perspective view of a second embodiment of the present invention, depicting a radial lug stabilizer and a second type of pipe coupling, receiving the stabilizer and joining the portions of abutting pipes together in a supported condition;

FIG. 6 is an exploded side elevational view of a detail showing the stabilizers, lock bolt, eyelet and a portion of the hanger rod of the structure depicted in FIG. 5;

FIG. 7 is a plan view of the blank from which the stabilizer of FIGS. 5 and 6 is made;

FIG. 8 is an end elevational view of a modified form of stabilizer; and

FIG. 9 is an end elevational view of another modified form of stabilizer.

DETAILED DESCRIPTION OF THE DRAWINGS

Figure 1:
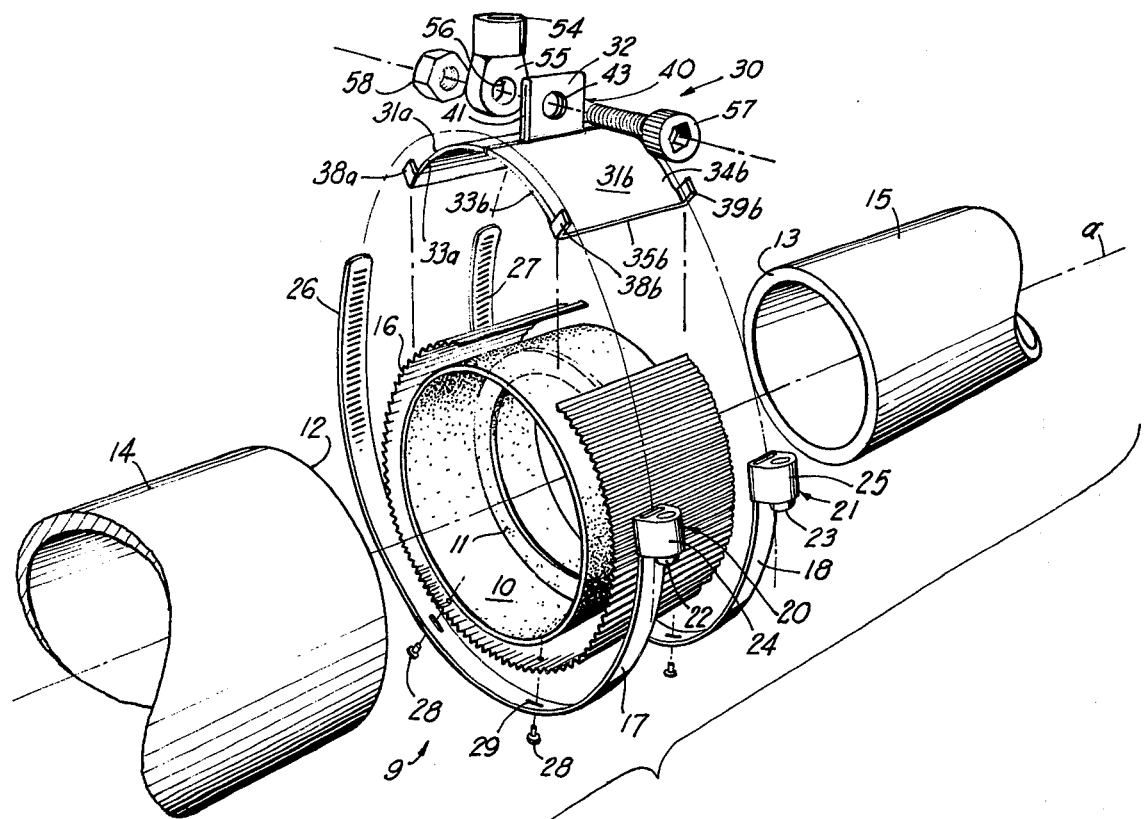
FIG. 1 is an exploded perspective view of a hanger assembly constructed in accordance with the present invention, the hanger assembly receiving the end portions of abutting pipes and having an axial lug stabilizer.
Figure 1:
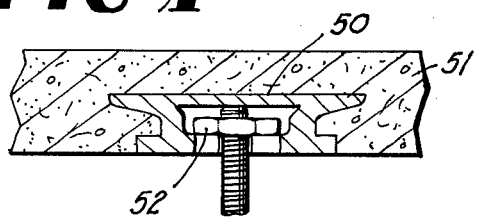
Figure 2:
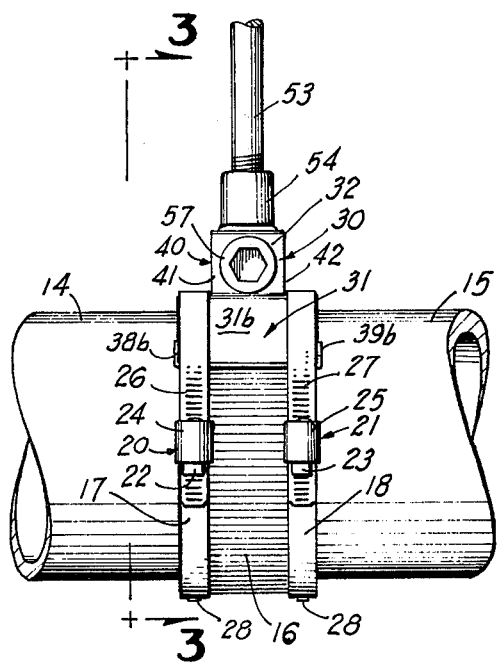
FIG. 2 is a side elevational view of the hanger assembly and pipes depicted in FIG. 1, the hanger assembly and pipes being supported by a hanger rod.
Figure 3:
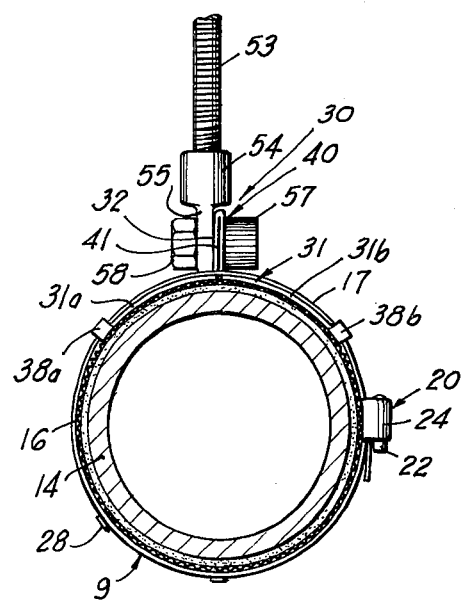
FIG. 3 is a cross-sectional view taken substantially along line 3—3 in FIG. 2, the drawing also depicting the suspension of the hanger rod from a structure.

Referring now in detail to the embodiments chosen for the purpose of illustrating the present invention, numbered 9 in FIG. 1, 2 and 3 denotes, generally, a pipe joint which butt joins the end portions of two abutting aligned pipes or pipe sections 14 and 15. In more detail, this pipe joint 9 includes a resilient, elastomeric, symmetrical, gasket 10 which is a straight, hollow, cylindrical member, provided with a central, annular, inwardly protruding, partition 11. The partition 11 is integrally formed with the gasket 10 and projects radially inwardly to provide an abutment of about the same thickness as and against which the ends 12 and 13 of the opposed straight, cylindrical cast iron pipes 14 and 15 abut.

The inside diameter of the gasket 10 is slightly larger than the outside diameter of the adjacent complimentary end portions of pipes 14 and 15 so that these end portions are snugly received within the gasket 10 as the partition 11 is sandwiched between ends 12 and 13. The pipes 14 and 15, therefore, are held, generally, in coaxial alignment along a longitudinal axis OC, shown by broken lines in FIG. 1.

A rectangular, sheet metal shield 16, having a width equal to or greater than the length of gasket 10 and a length greater than the outside circumference of gasket 10, encircles or surrounds the outer periphery of gasket 10. The end portions of shield 16 overlap each other when the shield 16 encompasses the gasket 10. Shield 16 is corrugated in an axial direction to provide lands and grooves for adding rigidly in the axial direction to the shield 16.

In FIGS. 1, 2 and 3, the shield 16 is shown being held in place and compressed against the outside periphery of gasket 10 by a pair of spaced, clamping or compression bands, belts or straps 17 and 18 are respectively provided with fastening members, denoted by numerals 20 and 21.

In the present embodiment, these fastening members 20 and 21 are on the ends of the bands 17 and 18 so as to secure, and progressively draw-in, their own other end portions. The fastening members 20 and 21 may be selected from any number of conventional toggle latches, buckles, clamps, welds, bands or detents which either tighten and hold the bands 17 and 18 or, once the bands 17 and 18 have been tensioned around the shell, will simply hold the end portions of the bands 17 or 18 together to form compression bails around the shield 16. The bands 17 and 18 hence each apply a force radially inwardly to cause the shield 16 to bind firmly the gasket 10 against the outside periphery of pipes 14 and 15 for preventing leaking of the butt joint, thus formed.

In the embodiments depicted in the drawings, the fastening members 20 and 21 are illustrated as including rotatable worm screws 22 and 23 respectively journalled for free rotation in housings 24 and 25. The housing 24 and 25 hold the screws 22 and 23 for tangentially exposing the threaded periphery of each screw 22 or 23 to the upper surface of the end portons of bands 17 or 18 for progressively engaging the thread of the screw in equally spaced slots 26 or 27 thereof, as the screw is rotated. Of course, when screw 22 or 23 is rotated in one direction, its associated band 17 or 18 is tightened as it is rotated in the opposite direction, the band 17 or 18 is loosened.

Spaced brads 28, pressing through longitudinal slots 29 in the lower periphery of the bands 17 and 18, secure the bands 17 and 18 in spaced relationship to the opposite edge portions of shield 16. The bands 17 and 18 are substantially more narrow than shield 16 so as to leave a space axially between the inner edges of the two bands 17 and 18 as their outer edges are radially aligned, respectively, with the edges of shield 16.

The pipe joint or coupling 9, thus far described is conventional, being disclosed in U.S. Pat. No. 3,233,922.

According to the present invention, a stabilizer, denoted by numeral 30, is provided, the function of which is to suspend the pipe joint or coupling 9 (and hence the joined end portions of pipe 14 and 15) from a supporting structure, while limiting appreciable movement of joint or coupling 9 in substantially any direction.

In more detail, the axial lug stabilizer 30, as depicted in FIG. 1, 2, 3 and 4, is produced from a flat, symmetrical blank (shown in FIG. 4) having a pair of spaced, opposed, rectangular, saddle plates 31a and 31b integrally joined along common parallel bend line edges 45a and 45b to a central lug plate 32. Saddle plate 31a has a pair of spaced, opposed, straight, parallel, side edges 33a and 34a, a straight outer edge 35a which is perpendicular to edges 33a and 34a, and inner edges 36a and 37a which respectively project inwardly toward each other from the inner ends of edges 33a and 34a. Edges 36a and 37a are aligned with edges 45a and each other.

At the outer edge 35a, the plate 31a is provided with a pair of small rectangular tabs 38a and 39a which project parallel to edge 35a, in opposite directions, away from the 33a and 34a, respectively.

In like manner, the plate 31b is complimentary to the plate 31a, having spaced, opposed, straight, parallel, side edges 33b and 34b, a straight outer edge 35b, inner edges 36b and 37b, bend line edge 45b and tabs 38b and 39b. Edges 33a and 33b are aligned with each other, as are edges 34a and 34b. Edges 35a, 35b, 37a, 37b are parallel to each other and the edges 36a, 37a and 45a being parallel to the aligned edges 36b, 37b and 45b.

The lug plate 32 is less wide than plates 31a or 31b, being defined by a pair of straight parallel side edges 41 and 42, the edge 41 extending between the inner ends of edges 36a and 36b and the edge 42 extending between the inner ends of edges 37a and 37b. The fold line edges 45a and 45b are perpendicular to edges 41 and 42 and form the proximal ends of the lug 40 when the blank is shaped. The lug plate 32 is provided with a pair of holes 43 which are equally spaced from the transverse center line or bend line 44 of the blank.

When the blank of FIG. 4 is shaped into the stabilizer 30 of FIGS. 1, 2 and 3, both the stamping of the blank and its subsequent shaping is produced by progressive dies (not shown) as will be understood by those skilled in the art. It will also be understood that, to reduce the adverse effect of knotch embrittlement, it would be desirable to curve or round out the corners forming the knotches. This would not depart from the scope of my invention.

When shaped from the blank of FIG. 4 to the stabilizer 30 of FIGS. 1, 2 and 3, the two saddle plates 31a and 31b are bent about bend line edges 45a and 45b, to be perpendicular to the lug plate 44. Then the lug plate 44 is bent against itself, about transverse center line 44 so as to align the saddle plates 31a and 31b. Also, the tabs 38a, 38b, 39a, 39b, at the corners of the blank, are bent upwardly, i.e., in the same direction as the reversely bent lug plate 32. Furthermore, the saddle plates 31a and 31b are bent arcuately about an axis spaced from the inner surface of the saddle plates 31a and 31b.

As seen in FIGS. 1, 2 and 3, the reversely bent lug plate 32 forms the lug 40 by providing opposed, flat, rectangular lug elements 32a and 32b joined at their distal or outer end by a common distal edge formed at bend line 44. Normally, the lug elements 32a, 32b are flat against each other so that holes 43 are aligned. The saddle plates 31a and 31b thus project in opposite directions from the proximal ends of the elements 32a and 32b at bend lines 45a and 45b. The bend lines 45a and 45b also form the proximal edges of saddle plates 31a and 31b, respectively.

When in final shape, saddle plates 31a, 31b form abutting segments of the arc of the saddle 31 since their adjacent proximal edges 36a and 37b are brought into contiguous relationship. The transverse curvature of the saddle 31 is such that the upper surface of saddle 31 is convex and the lower surface is concaved. This curvature is uniform and essentially continuous so that, when saddle 31 is secured against the shield 16, the two are concentric.

The width of the saddle 31, i.e., the axial distance from one edge 33a to the other edge 34a, or from edge 33b to edge 34b is equal to the width of shield 16. Thus, the distance from one radially outwardly projecting tab 38a or 38b to its opposed tab 39a or 39b is equal to or slightly greater than the distance from the outer edge of band 17 to the outer edge of band 18. Thus, these bands 17 and 18, in passing over the outer periphery of the saddle 31, pass inwardly adjacent the tabs 38a, 38b, 39a, 39b with band 17 adjacent to tabs 38a, 38b, and band 18 adjacnet to tabs 39a and 39b.

Furthermore, the width of lug 40, i.e., from edge 41 to edge 42 is equal to or slightly less than the distance between the inner edges of bands 17 and 18. Hence, with the bands 17 and 18 tightened, axial outward movement of the bands 17 and 18 is limited by the tabs 38a, 38b, 39a, 39b and inward movement of the bands 17 and 18 is limited by edges 41 and 42 of the flat lug 40, since it forms a space element for between the bands.

Since the saddle 31 is firmly sandwiched between the bands 17 and 18 and the shield 16, with the gasket 10 compressed and thus resiliently urging the shield 16 into fractional engagement with the lower surface of saddle 31 and with the bands 17 and 18 applying radial forces inwardly, on the upper surface of the saddle 31, it is held, quite firmly, in place and will not, under normal conditions, shift in any direction. Therefore, the position of lug 40 is quite stationary with respect to the pipes 14 and 15.

Due to the symmetry of the stabilizer 30 and the pipe coupling or joint 9, the center of aligned holes 43 in lug 40 is always on the radial plane of partition 11. Thus, it is important to note that the lug 40 will support the joint 9 at the very junction of pipes 14 and 15.

In the usual installation, as depicted in FIG. 3, an anchor insert 50 is inserted into the concrete flooring 51 for receiving an internally threaded nut 52. One end of an externally threaded hanger rod 53 is threaded upwardly into nut 52 and the other end threadedly receives the body of an eyelet 54. The lower portion of eyelet 54 has a flat eye 55 provided with a hole 56. When holes 43 and 56 are aligned, they receive a bolt 57 therethrough so that a nut 58 threaded on the end of bolt 57 prevents its removal. This firmly clamps the stabilizer 30 in place with respect to the supporting structure or flooring 51.

The hanger assembly depicted in FIGS. 1, 2, 3 and 4 is recommended for 1½ to 4 inch pipe. Larger installations should use the structure of the second embodiment, depicted in FIGS. 5, 6 and 7. This second embodiment is primarily for 5 inch, 6 inch and 8 inch cast iron pipes.

In more detail, the structure depicted in FIGS. 5, 6 and 7 include a pipe joint or coupling 109 provided with a gasket 110, for coupling pipes 114 and 115 in the manner described above. The coupling 109 also includes a shield 116 which is surrounded by spaced compression bands 117 and 118. These compression bands 117 and 118 are retained in place on the shield by brads 128 which pass through slots 129 in the bands 117 and 118. The slots 129 permit limited adjustment circumferentially of the bands 117 and 118 with respect to the shield 116. Of course, no brads 128 are provided in the vicinity of the stabilizer, denoted generally by numeral 130.

It will be seen in FIG. 5 that coupling 109 is provided with a total of four compression juxtaposed bands. Thus, between the outer bands 117 and 118 are provided a pair of inner bands 117a and 118a, each being identical and spaced from each other axially. The construction of the joint or coupling 109 is conventional and is illustrated in the above mentioned Pamphlet 100, on page 2 thereof.

According to the present invention, the radial lug stabilizer 130 is produced from a blank depicted in FIG. 7. This blank includes a pair of spaced opposed saddle plates 131a and 131b which form the saddle 131 of stabilizer 130. The saddle plate 131a is defined by a pair of opposed parallel side edges 133a and 134a, an outer or distal edge 135a and an inner or proximal edge in the form of a bend line 145a.

Spaced tabs 138a and 139a project outwardly from distal edge 135a. The saddle plate 131b is complimentary to plate 131a, being provided with opposed edges 133b and 134b, and outer distal edge 135b and an inner or proximal bend line 145b. Tabs 138b and 139b extend outwardly from distal edge 135b in a direction opposite to the direction in which tabs 138a and 139a project.

The plates 131a and 131b are connected together, integrally, by a lug plate 132, the lug plate extending from the bend line 145a to bend line 145b. As seen in FIG. 7, there is provided a small recess in one edge of one portion of the lug plate 132 so as to provide a recessed edge 141 which is spaced inwardly from the aligned edges 133a and 133b. Offset from the edge 141 in a recess on the opposite side of the plate 132, the recess providing a recessed edge 142 which is spaced inwardly from the aligned edges 134a and 134b. The inwardly edge 141 extends from the saddle plate 131a inwardly to the transverse center line 144 of plate 132. On the opposite side, the edte 142 extends inwardly from the plate 131b to terminate adjacent the center line 144. Center line 144 in parallel to and equidistant between bend lines 145a and 145b as well as being parallel to the distal edges 135a and 135b.

Between the termination of edge 142 and the plate 131a, the plate 132 is provided with flange 137, the outer edge which is parallel to side edges 134a and 134b. In like manner, between the end of edge 141 and plate 131b, the plate 132 is provided a flange 136, the outer edge of which is parallel to side edges 133a and 133b.

When the blank shown in FIG. 7 is assembled into the stabilizer 130 depicted in FIGS. 5 and 6, the blank is bent along the center line 144 so as to fold one-half of the blank against the other half of the blank. The plates 131a and 132b are folded outwardly along bend lines 145a and 145b. The folding of the plate 132 produces the flat rectangular lug 140 in which the holes 143 are in alignment with each other. This upstanding lug 140 is completed by the bending of flange over edge 141 and the bending of flange 137 over edge 142. These flanges thus lock the two halves of the plate 132 in place so that they will not pivot their common upper edge formed by bend line 144.

The plates 131a and 131b are deformed arcuately around an axis spaced below plates 131a and 131b and perpendicular to the plane of the lug 140. Thus, the outer or upper surface of saddle 131 is convex and the inner or lower surface is concave. This curvature conforms to the contour of the outer periphery of the shield 116 when it is wrapped around the end portions of pipes 114 and 115.

The tabs 138a, 138b, 139a, 139b are respectively turned upwardly or outwardly, so that they project about parallel to and in the direction of the lug 140.

When the plates 131a and 131b are deformed to produce the curvature, the metal is stretched in the vicinity of the proximal ends of plates 131a and 131b and the proximal ends of lug elements 142a and 142b.

When the radial lug stabilizer 130 is installed, the saddle 131, formed by saddle plates 131a and 131b, is sandwiched between the juxtaposed compression or clamping bands 117, 117a, 118, 118a and shield 116. Bands 117 and 117a pass over plate 131a while bands 118 and 118a pass over plate 131b so as to pass on opposite sides of lug 140. No appreciable spacing is necessary between the inner bands 117a and 118a, since lug 140 projects radially between them and is essentially flat.

When the bands 117, 117a, 118, 118a are tightened, the lug 140 is quite firmly fixed with respect to the pipes 114 and 115. A bolt 157, which passes through the holes 143 and into the hole of the eyelet 155, is secured in place by bolt 158 while the body 154 of the eyelet 155 threadedly receives the hanger rod 153, in a manner similar to that described for the preceding embodiment. The hanger rod 153 securely supports, from a supporting structure, the ends of the pipes 114, 115 at the joint, as recommended by most of the plumbing codes.

The saddle 131 is approximately by the width of the shield 116 and the tabs 138a, 138b, 139a, 139b are disposed adjacent the outer edges of bands 117, 118. Thus tabs 138a, 139a prevent outward movement of the band 117, with respect to the saddle plate 131a. In like manner, the tabs 138b, 139b prevent outward movement of the band 118. These tabs 138a, 138b, 139b also align the saddle 131 properly with the bands 117 and 118.

If desired, the upper corners of saddle plates 131a and 131b may be provided with additional upturned tabs to arrest inward movement of the bands 117a and 118a. Such an upturned tab 238 is illustrated in FIG. 9, the tab 138 being carried by the saddle plate 231a adjacent its inner corners. The outer corner of plate 231a has tabs, such as tab 238a. The saddle plate 231a, of course, is otherwise identical in construction to the saddle plate 131a and has an upstanding lug 240 which projects from the central portion of the outer surface of the saddle 231.

Still another modification is found in FIG. 8 wherein the element 32a and 32b of the lug plate 32 are illustrated as diverging downwardly from each other at angle $\beta$. By such an arrangement, the stabilizer 30 can be produced to fit varying diameter couplings 9. When such a stabilizer 30, as illustrated in FIG. 8 is employed, the bending of common upper edge 44 will adjust the positions of the saddle plates 31a and 31b to conform generally to the contour of the shield 16. If the shield 16 is relatively large, the angle will be large and the saddle plates 31a and 31b will conform generally to the larger diameter shield 16. On the other hand, should the couplings 9 be for a smaller pipe size, the urging together of the lug elements 32a and 32b to form a smaller angle or no angle at all, will reduce the effective radius of the saddle plates 31a and 31b so that they conform to the smaller diameter shield 16.

It is now seen that the present application discloses a very inexpensive and yet efficient way of supporting a pipe joint, at the pipe joint itself. Furthermore, when properly installed, the stabilizer 30 or 130 and coupling 9 or 109 of the present invention will quite firmly hold the joined pipes 14, 15 or 114, 115 against any appreciable movement in any direction. Since the saddles 31 or 131 of the stabilizers 30 or 130 conform to the curvature of the shields 16 or 116 of the couplings 9 or 109, the presence of the saddle plates 31a, 31b, 131a, 131b between the shield 16 or 116 and the compression bands 17, 18 or 117, 117a, 118, 118a does not materially affect the function of the compression bands in applying uniform circumferential pressure for sealing the gaskets 10 or 110.

The use of the stabilizers 30 or 130 in conjunction with the couplings 9 or 109, however, materially reduce not only the cost of the equipment necessary to produce a properly supported pipe joint but materially reduce the amount of labor involved in making the installation.

Furthermore, the stabilizer of the present invention occupies very little space and, therefore, can be installed where other hanger assemblies cannot be employed. No appreciable increase in diameter of the joint is involved in utilizing the stabilizer of the present invention, except, of course, the increase necessitated by the outwardly projecting lug.

If the bolts 22, 23, 57 or 157 receive the same size Allen wrench or screwdriver, only this single tool is necessary for the entire installation.

What is claimed:

1. A hanger assembly comprising, in combination, a coupling for joining two end portions of pipes together and a stabilizer secured to said coupling, said stabilizer including a lug projecting away from said coupling by means of which the coupling and pipes can be supported from a supporting structure and a saddle carrying said lug, and a band for circumscribing a portion of the coupling, said band passing over a portion of said saddle, said saddle conforming to the contour of said coupling and being sufficiently thin that it does not materially alter the contour of the circumscribing band.

2. The hanger assembly defined in claim 1 wherein said stabilizer includes a saddle, said lug projecting outwardly from the central portion of said saddle, and wherein said coupling includes an additional band, the pair of bands passing on opposite sides of said lug and for passing around the junction of said end portions of said pipes.

3. The hanger assembly defined in claim 1 wherein said coupling includes a shield for extending around said end portions of said pipes and a pair of compression bands outwardly of and for extending around said shield for compressing said shield toward said end portions of said pipe when said shield extends around said end portions of said pipe, and wherein said stabilizer includes a saddle for carrying said lug, said saddle projecting in opposite directions from said lug and being curved to be generally concentric with said shield and said bands when they are installed around said end portions of said pipe, said saddle being sufficiently wide that said bands will simultaneously pass over said saddle and on opposite sides of said lug for securing said saddle against said shield.

4. The hanger assembly defined in claim 3 wherein said lug is generally flat and is disposed radially with respect to said coupling, when said coupling is installed on said end portions of said pipes.

5. The hanger assembly defined in claim 3 wherein said lug is generally flat and is disposed axially with respect to said coupling, when said coupling is installed on said end portions of said pipes.

6. The hanger assembly defined in claim 3 including tabs projecting outwardly from the edges of said saddle, said tabs confining said bands therebetween, when the coupling and saddle are installed on the end portions of said pipes.

7. The hanger assembly defined in claim 4 wherein said lug includes a pair of flat lug elements joined along a common edge and diverging from each other as they extend away from said common edge, said saddle including a pair of saddle plates extending in opposite directions respectively from the edges of said lug elements.

8. The hanger assembly defined in claim 1 wherein said lug is generally flat and provided with a hole through which a bolt can project for securing said lug to said supporting structure.

9. A hanger assembly comprising in combination:
   a. a coupling for joining two abutting end portions of pipes together, said coupling including a shield for extending around said end portions of said pipes and a pair of radially spaced compression bands circumscribing said shield for compressing said shield toward said end portions of said pipe;
   b. a stabilizer for securing said coupling to a supporting structure, said stabilizer including a saddle removably disposed between said shield and said bands and a lug carried by said saddle and protruding outwardly of said coupling and said saddle.

10. The assembly defined in claim 9 wherein said lug and said saddle are formed from a unitary sheet metal blank, said blank having spaced opposed saddle plates and a lug plate between and integrally joining said saddle plates along common edges, said lug plate being reversely bent intermediate its ends to define a pair of opposed abutting lug elements joined at their distal ends by another common edge, said blank being bent at the common edges of each of said saddle plates and said lug for disposing said saddle plates in oppositely extending relationship; respectively extending from said lug elements.

11. The assembly defined in claim 10 wherein one of said saddle plates is received under one of said bands and the other of said saddle plates is received under the other of said bands.

12. The assembly defined in claim 10 wherein said saddle plates are wider than said lug plates for providing end portions of said saddle plates which protruded beyond said lug plates, said end portions of said saddle plates at one end of said lug plates extending beneath one of said bands and said end portions of said saddle plates at the other end of said lug plates extending beneath the other of said bands.

* * * * *